US011416262B1

(12) United States Patent
Bornhoevd et al.

(10) Patent No.: US 11,416,262 B1
(45) Date of Patent: Aug. 16, 2022

(54) SYSTEMS AND METHODS FOR IMPROVING COMPUTATIONAL SPEED OF PLANNING BY ENABLING INTERACTIVE PROCESSING IN HYPERCUBES

(71) Applicant: Workday, Inc., Pleasanton, CA (US)

(72) Inventors: Christof Bornhoevd, Belmont, CA (US); Neil Thombre, Saratoga, CA (US)

(73) Assignee: Workday, Inc., Pleasanton, CA (US)

( * ) Notice: Subject to any disclaimer, the term of this patent is extended or adjusted under 35 U.S.C. 154(b) by 616 days.

(21) Appl. No.: 16/417,350

(22) Filed: May 20, 2019

Related U.S. Application Data

(60) Provisional application No. 62/674,854, filed on May 22, 2018.

(51) Int. Cl.
| | | |
|---|---|---|
| *G06F 9/38* | (2018.01) | |
| *G06F 9/50* | (2006.01) | |
| *G06F 16/901* | (2019.01) | |
| *G06F 11/34* | (2006.01) | |
| *G06F 16/28* | (2019.01) | |
| *G06F 15/80* | (2006.01) | |

(52) U.S. Cl.
CPC .......... *G06F 9/3895* (2013.01); *G06F 9/5066* (2013.01); *G06F 9/5072* (2013.01); *G06F 11/3404* (2013.01); *G06F 16/283* (2019.01); *G06F 16/9024* (2019.01); *G05B 2219/32131* (2013.01); *G05B 2219/35011* (2013.01); *G06F 15/803* (2013.01)

(58) Field of Classification Search
None
See application file for complete search history.

(56) References Cited

U.S. PATENT DOCUMENTS

| | | | | |
|---|---|---|---|---|
| 9,817,876 | B2* | 11/2017 | Demonsant | G06F 16/275 |
| 10,140,352 | B2* | 11/2018 | Hariharan | G06F 16/283 |
| 2001/0056440 | A1* | 12/2001 | Abramson | G06F 40/18 715/219 |
| 2002/0059203 | A1* | 5/2002 | Witkowski | G06F 16/283 |
| 2006/0265712 | A1* | 11/2006 | Zhou | G06F 40/143 718/102 |
| 2007/0260667 | A1* | 11/2007 | Duzak | G06F 40/18 708/446 |
| 2009/0106184 | A1* | 4/2009 | Lang | G06Q 30/02 706/59 |
| 2009/0113284 | A1* | 4/2009 | Kulkarni | G06F 40/18 715/219 |
| 2009/0210430 | A1* | 8/2009 | Averbuch | G06F 16/283 |

(Continued)

*Primary Examiner* — Abu Zar Ghaffari
(74) *Attorney, Agent, or Firm* — Van Pelt, Yi & James LLP

(57) ABSTRACT

A system for assigning a workload to compute resources includes an interface and a processor. The interface is configured to receive a workload. The processor is configured to break the workload into a set of subproblems; and for a subproblem of the set of subproblems: determine whether the subproblem benefits from intersheet parallelism; determine whether the subproblem benefits from intrasheet parallelism; determine whether the subproblem benefits from directed acyclic graph (DAG) partitioning; and assign the subproblem, wherein assigning the subproblem utilizes optimization when appropriate based at least in part on benefits from the intersheet parallelism, the intrasheet parallelism, and the DAG partitioning.

22 Claims, 19 Drawing Sheets

(56) References Cited

U.S. PATENT DOCUMENTS

| | | | |
|---|---|---|---|
| 2011/0185305 A1* | 7/2011 | Lai | G06F 40/18 |
| | | | 715/772 |
| 2015/0199328 A1* | 7/2015 | Danziger | G06Q 10/101 |
| | | | 715/219 |
| 2018/0203838 A1* | 7/2018 | Hiatt | G06F 16/285 |
| 2018/0300280 A1* | 10/2018 | Suzuki | G06F 13/42 |

* cited by examiner

900

|  | Q1 | Q2 | H1 | Q3 | Q4 | H2 | FY |
|---|---|---|---|---|---|---|---|
| Units | 3 | 4 | 7 | 6 | 12 | 18 | 25 |
| Price | 10 | 5 | 7.1 | 10 | 5 | 6.7 | 6.8 |
| Bookings = Units * Price | 30 | 20 | 50 | 60 | 60 | 120 | 170 |
| Rent | 20 | 20 | 40 | 25 | 25 | 50 | 90 |
| Fees | 5 | 10 | 15 | 20 | 5 | 25 | 40 |
| Expenses = Rent + Fees | 25 | 30 | 55 | 45 | 30 | 75 | 130 |

SYSTEMS AND METHODS FOR IMPROVING COMPUTATIONAL SPEED OF PLANNING BY ENABLING INTERACTIVE PROCESSING IN HYPERCUBES

CROSS REFERENCE TO OTHER APPLICATIONS

This application claims priority to U.S. Provisional Patent Application No. 62/674,854 entitled SYSTEMS AND METHODS FOR IMPROVING COMPUTATIONAL SPEED OF PLANNING BY ENABLING INTERACTIVE PROCESSING IN HYPERCUBES filed May 22, 2018 which is incorporated herein by reference for all purposes.

BACKGROUND OF THE INVENTION

Planning systems typically utilize a large multidimensional data space for representing complex systems or organizations. The data space can easily include billions of cells requiring calculations. Formulas for calculating cell values include references to other cell values, creating a complex network of references. Planning systems additionally typically allow the computation of multiple plans at once—for example, computation of a best, typical, and worst case. Despite this high level of complexity, it is desirable for planning systems to be interactive tools that produce computation results very quickly. For the planning system to achieve interactive response time as plans get larger and more complicated, it must not be limited by the practical bounds of memory on a single computing resource. This creates a problem where the planning system must be able to efficiently utilize multiple computing resources at once.

BRIEF DESCRIPTION OF THE DRAWINGS

Various embodiments of the invention are disclosed in the following detailed description and the accompanying drawings.

FIG. 9 is a diagram illustrating an embodiment of intrasheet parallelism.

DETAILED DESCRIPTION

Figure 1:
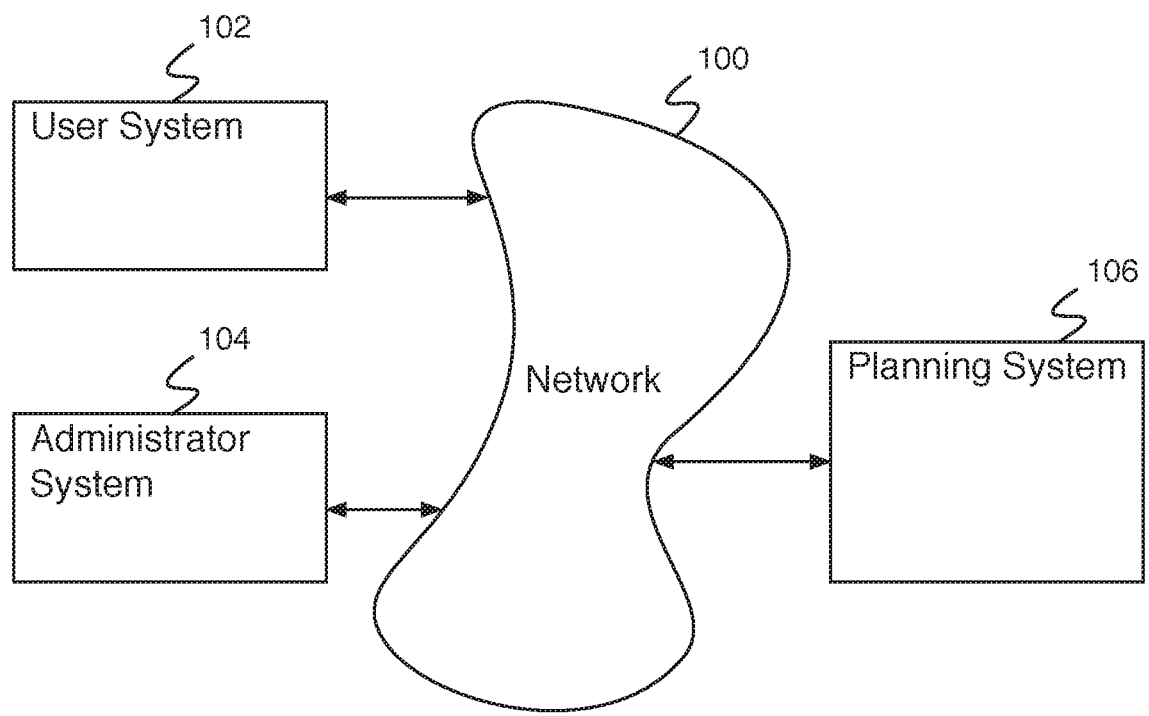
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for assigning a workload to compute resources comprises an interface configured to receive a workload, and a processor configured to break the workload into a set of subproblems, and for a subproblem of the set of subproblems, determine whether the subproblem benefits from intersheet parallelism, determine whether the subproblem benefits from intrasheet parallelism, determine whether the subproblem benefits from DAG (e.g., directed acyclic graph) partitioning, and evaluate the subproblem, wherein evaluating the subproblem utilizes optimization when appropriate based at least in part on benefits from the intersheet parallelism, the intrasheet parallelism, and the DAG partitioning.

A system for assigning a workload to compute resources comprises a system for determining whether one or more of a set of optimizations is appropriate for computing a workload, and evaluating the workload utilizing any appropriate optimizations. For example, a workload comprises a large interdependent set of computations arranged according to a business plan. The workload comprises a set of sheets of a multidimensional cube comprising a set of cells, each cell containing either an explicit value (e.g., "22") or a formula referencing other cells (e.g., "cellvalue(sheet1:A22)+cellvalue(sheet2:B22)+cellvalue(sheet3:C22)"). The cells are logically organized into sheets, wherein each sheet represents a different logical portion of the workload. Evaluating the workload comprises determining the value of each cell comprising a formula. Assigning the workload to compute resources comprises dividing the workload into a set of sections, wherein each section can be computed independently on separate compute resources. In the event that a computation processed on a first resource depends on a value on a second resource, the value can be accessed through communication of the resources, however, this communication slows the computation considerably. It is thus important to minimize dependencies across compute resources. The system for assigning a workload to compute resources attempts to divide the workload into sections using three different techniques: intersheet parallelism, intrasheet parallelism, and DAG partitioning.

A workload is arranged in sheets according to the particulars of the system modeled by the planning system. Dependencies can exist between cells in different sheets. Some planning system organizational schemes have no dependencies between sheets or very simple dependencies between sheets (e.g., a single cell in a first sheet depending on a single cell in a second sheet). Some schemes have moderately complex dependencies (e.g., every cell in a column of a first sheet depending on a corresponding cell in a second sheet). Some schemes have highly complex dependencies (e.g., many cells in the first sheet depending on cells in the second sheet in an irregular arrangement, dependencies going in both directions between sheets, etc.). Intersheet parallelism comprises dividing a workload by assigning sheets to separate compute resources. For example, intersheet parallelism is beneficial in the event that dependencies between sheets are not present at all, are simple, or only moderately complex.

Dividing planning system sheets into independent subsheets (e.g., utilizing intrasheet parallelism) is another method of breaking up the workload. For example sheets can be divided into independent sections comprising different time periods, different products, different organizational units, etc. It can be determined whether intrasheet parallelism is a useful technique for dividing a workload based on a number of independent computable regions able to be determined from a sheet.

A map of the dependencies of cells on other cells forms a structure called a directed acylic graph (DAG). For example, dependencies are one way relationships (e.g., if cell A depends on cell B then cell B does not depend on cell A) and do not form cycles (e.g., if cell A depends on cell B and cell B depends on cell C then cell C does not depend on cell A). A wealth of mathematical research on properties of and operations on DAGs exists and may be leveraged.

Analyzing the workload as a DAG ignores the arrangement of the cells into sheets. Representing the workload as a DAG, disconnected subgraphs that can be computed independently can be identified and assigned to separate computing resources. In the event the workload DAG cannot be separated into enough disconnected subgraphs, a disconnected subgraph can be divided using a minimum cut algorithm to divide the disconnected subgraph into a set of subgraphs comprising a minimum set of connections. Once the set of potential optimizations has been analyzed, the workload is evaluated, wherein evaluating the subproblem utilizes optimization when appropriate based at least in part on benefits from the intersheet parallelism, the intrasheet parallelism, and the DAG partitioning.

The system improves the computer by making the computation faster. Evaluation and utilization of the optimization planning strategies (e.g., intersheet parallelism, intrasheet parallelism, and DAG partitioning) are able to make calculation faster for the evaluation of formulas in sheets of a hypercube by assigning appropriate pieces of the calculation to be processed by different compute resources with some computation parallelism and, typically, some dependencies between the compute resources.

FIG. 1 is a block diagram illustrating an embodiment of a network system. In some embodiments, the network system of FIG. 1 comprises a network system for a planning system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, and planning system 106 communicate via network 100.

User system 102 comprises a user system for use by a user. A user uses a user system to interact with planning system 106—for example, to store planning data, to request planning data, to request reporting based on planning data, to evaluate planning calculations, etc. In some embodiments, the network system of FIG. 1 comprises a plurality of user systems associated with one or more users. Administrator system 104 comprises an administrator system for use by an administrator. Administrator system 104 comprises an administrator system for executing administrator commands, for configuring planning system 106, etc.

Planning system 106 comprises a planning system for organizational planning. For example, planning system 106 comprises an interface configured to receive a workload, and a processor configured to break the workload into a set of subproblems, and for a subproblem of the set of subproblems, determine whether evaluation of the subproblem benefits from intersheet parallelism, determine whether evaluation of the subproblem benefits from intrasheet parallelism, determine whether evaluation of the subproblem benefits from DAG (e.g., directed acyclic graph) partitioning, and evaluate the subproblem, wherein evaluating the subproblem utilizes optimization when appropriate based at least in part on benefits from the intersheet parallelism, the intrasheet parallelism, and the DAG partitioning.

Figure 2:
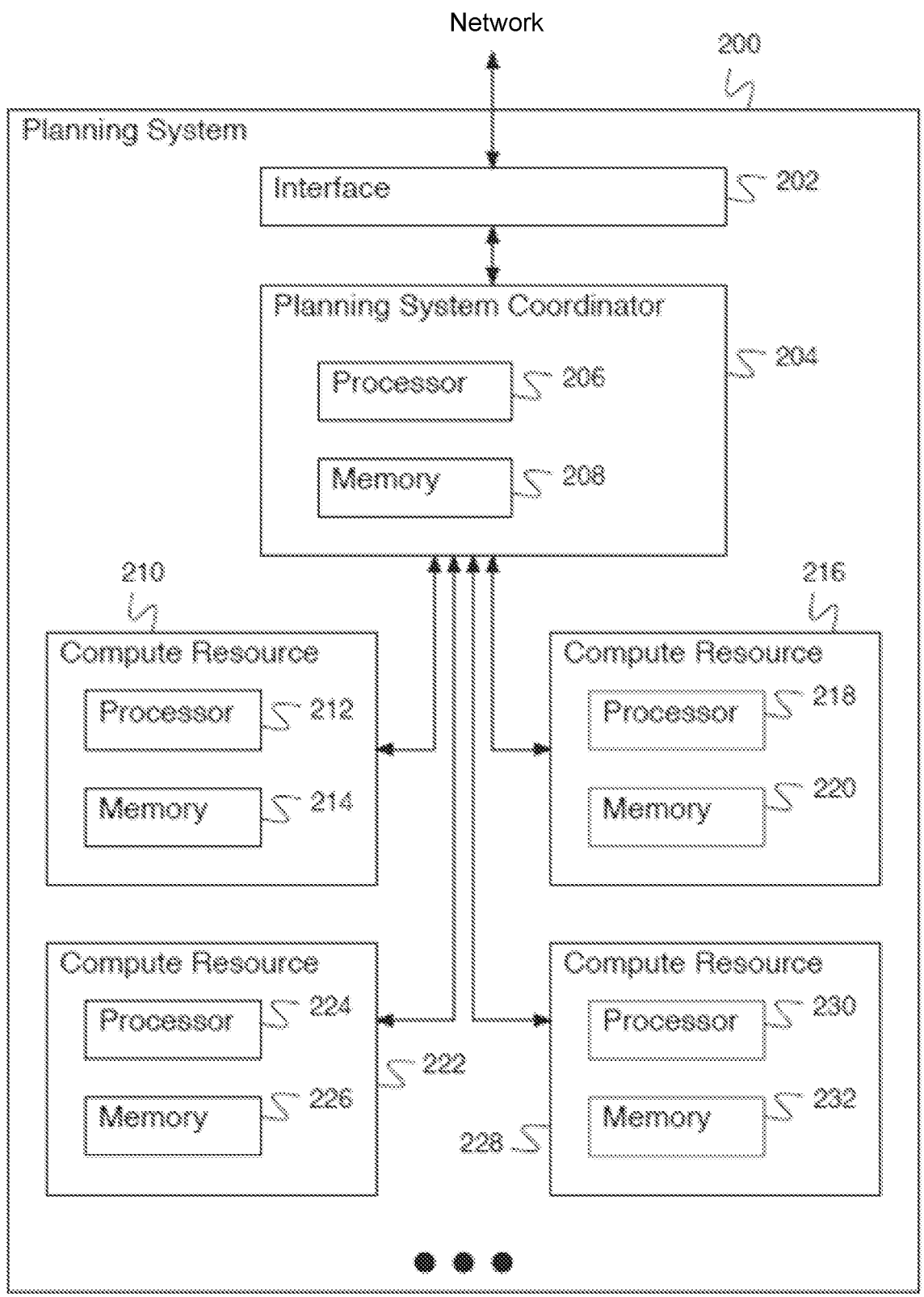
FIG. 2 is a block diagram illustrating an embodiment of a planning system.

FIG. 2 is a block diagram illustrating an embodiment of a planning system. In some embodiments, planning system 200 comprises planning system 106 of FIG. 1. In the example shown, planning system 200 comprises interface 202, planning system coordinator 204, and a plurality of compute resources (e.g., compute resource 210, compute resource 216, compute resource 222, compute resource 228, etc.). Interface 202 comprises an interface for receiving commands, receiving data, receiving a workload, providing command responses, providing computation results, etc. Planning system coordinator 204 comprises a system for coordinating evaluations for planning system 200. Planning system coordinator 204 comprises processor 206 for executing instructions, processing data, etc., and memory for storing instructions, storing data, storing evaluation results, etc. Planning system coordinator 204 receives a workload for processing and determines how the workload should be processed. For example, planning system coordinator 204 comprises a system configured to break a workload into a set of subproblems, and for a subproblem of the set of subproblems, determine whether evaluation of the subproblem benefits from intersheet parallelism, determine whether evaluation of the subproblem benefits from intrasheet parallelism, determine whether evaluation of the subproblem benefits from DAG (e.g., directed acyclic graph) partitioning, and evaluate the subproblem, wherein evaluating the subproblem utilizes optimization when appropriate based at least in part on benefits from the intersheet parallelism, the intrasheet parallelism, and the DAG partitioning. Planning system coordinator provides workload portions for processing to compute resources. Compute resource 210 comprises processor 212 for processing data and memory 214 for storing data, compute resource 216 comprises processor 218 for processing data and memory 220 for storing data, compute resource 222 comprises processor 224 for processing data and memory 226 for storing data, and compute resource 228 comprises processor 230 for processing data and memory 232 for storing data. Planning system 200 comprises any appropriate number of compute resources. Data processing capabilities of each compute resource are limited by their processing power (e.g., processor speed, number of processors, processor bandwidth, etc.) and their memory size. Planning system coordinator 204 attempts to break a workload into a set of parts for execution by the set of compute resources, wherein the number of parts is at least as large as the number of available compute resources (e.g., in order to fully take advantage of the available compute resources) and each part is able to fit on an available compute resource.

Figure 3:
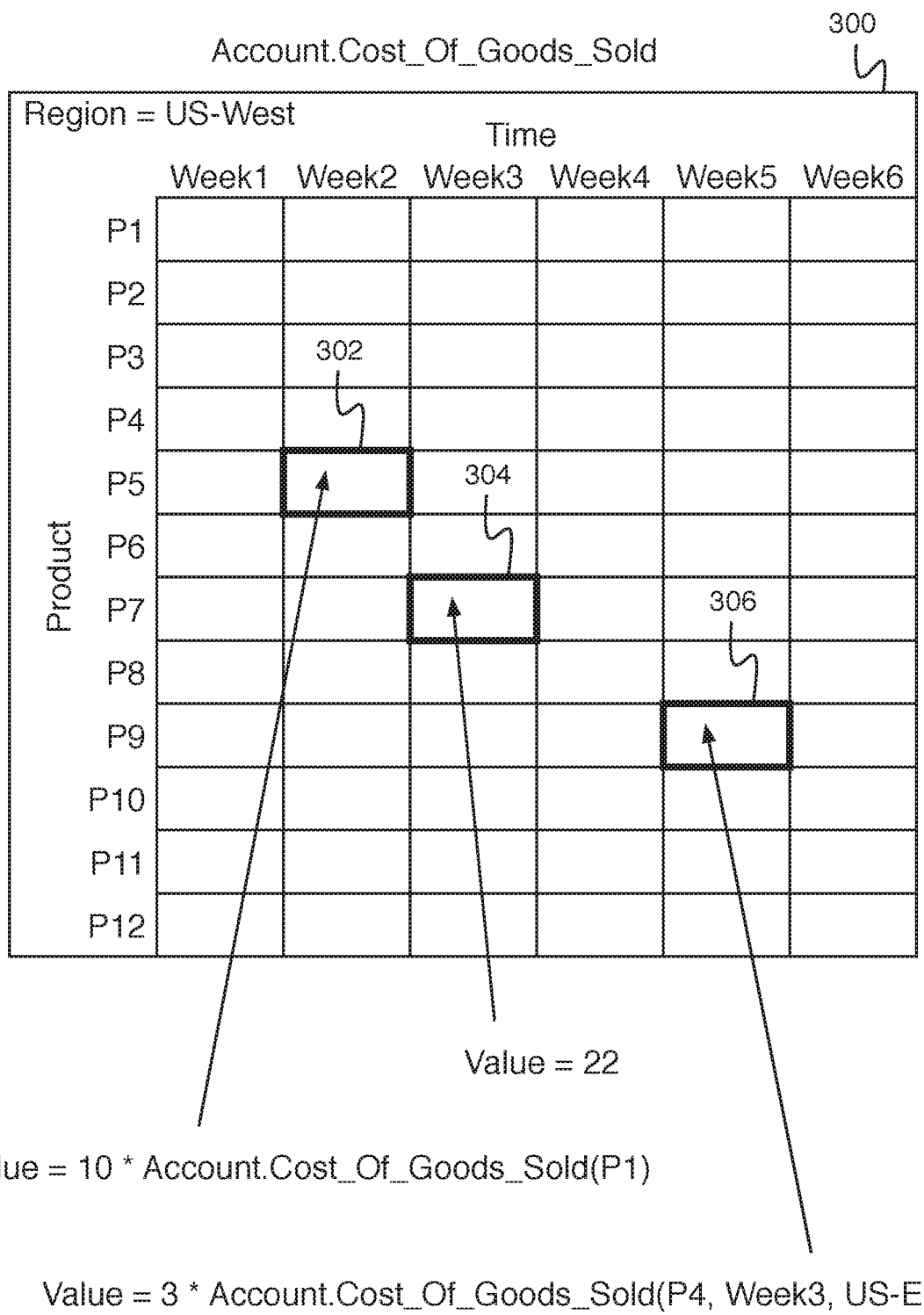
FIG. 3 is a diagram illustrating an embodiment of a portion of planning system data.

FIG. 3 is a diagram illustrating an embodiment of a portion of planning system data. In some embodiments, planning system data 300 is stored in memory 208 of FIG. 2 or in a memory of a compute resource of FIG. 2. In the example shown, planning system data 300 comprises a plurality of cells. The location of each cell is associated with values of each of a set of dimensions. For example, cell 302 is associated with Product=P5 and Time=Week2. All cells shown in planning system data 300 are associated with Region=US-West and Account=Cost_Of_Goods_Sold. Other portions of planning system data that are not shown are associated with other values for Region or Account. For example, planning system data 300 comprises a portion of a hypercube.

Cells of planning system data 300 store either a formula or a number. For example, cell 304 comprises the number 22. Cell 306 comprises the formula Value=3*Account.Cost_Of_Goods_Sold(P4, Week3, US-East). The portion of the formula "Account.Cost_Of_Goods_Sold(P4, Week3, US-East)" comprises a reference to the value stored in the cell associated with Account=Cost_Of_Goods_Sold, Region=US-East, Product=P4, and Time=Week3. The reference comprises a term. Cell 302 comprises the formula Value=10*Account.Cost_Of_Goods_Sold(P1). The term of the formula of cell 302 indicates Account=Cost_Of_Goods_Sold and Product=P1, however, other dimensions are not indicated in the term. The other dimensions are inherited from the scope of the cell. For example, the term of the formula of cell 302 inherits Region=US-West and Time=Week2. For example, using inheritance, the same formula can have different values if it is stored in different locations.

Figure 4:
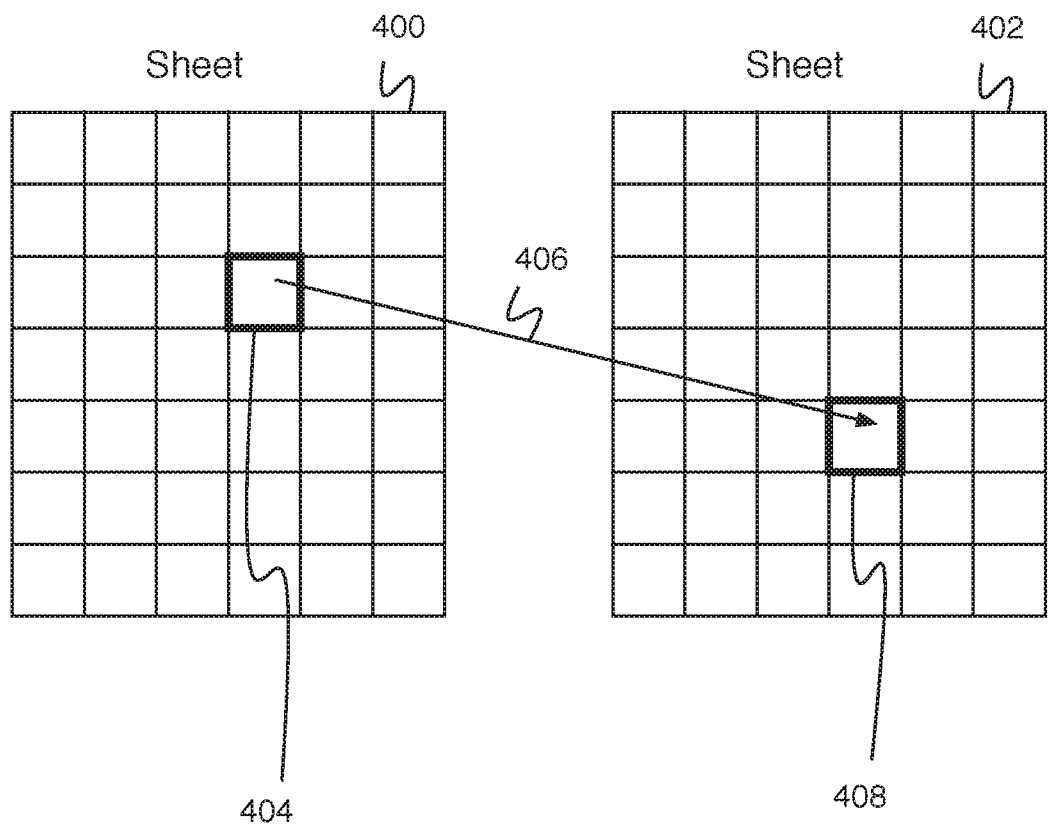
FIG. 4 is a diagram illustrating an embodiment of a rope link dependency.

FIG. 4 is a diagram illustrating an embodiment of a rope link dependency. In some embodiments, sheet 400 and/or sheet 402 comprise planning system data 300 of FIG. 3. In the example shown, cell 404 of sheet 400 has dependency 406 on cell 408 of sheet 402, and no other dependencies exist between sheet 400 and sheet 402. Linking between two sheets by a single dependency comprises a rope link dependency. In some embodiments, linking between two sheets by fewer than 5 dependencies comprises a rope link dependency.

Figure 5:
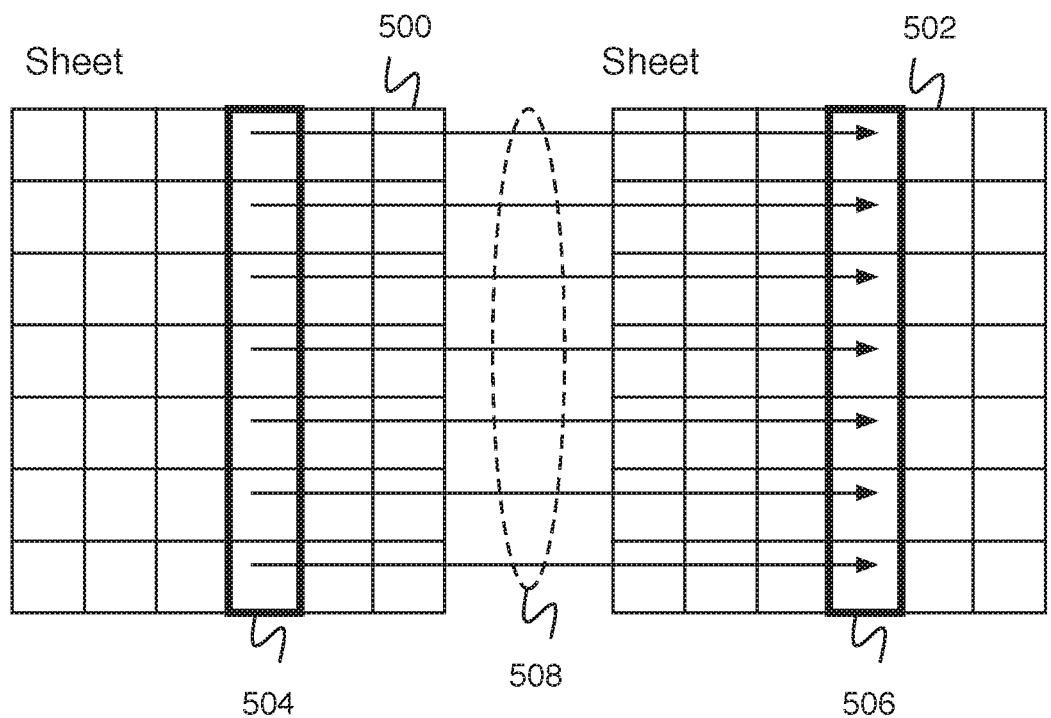
FIG. 5 is a diagram illustrating an embodiment of a ladder link dependency.

FIG. 5 is a diagram illustrating an embodiment of a ladder link dependency. In some embodiments, sheet 500 and/or sheet 502 comprise planning system data 300 of FIG. 3. In the example shown, column of cells 504 has a one to one dependency on column of cells 506, illustrated by dependency 508. Linking between two sheets by a one to one dependency in a row or column comprises a ladder link dependency.

Figure 6:
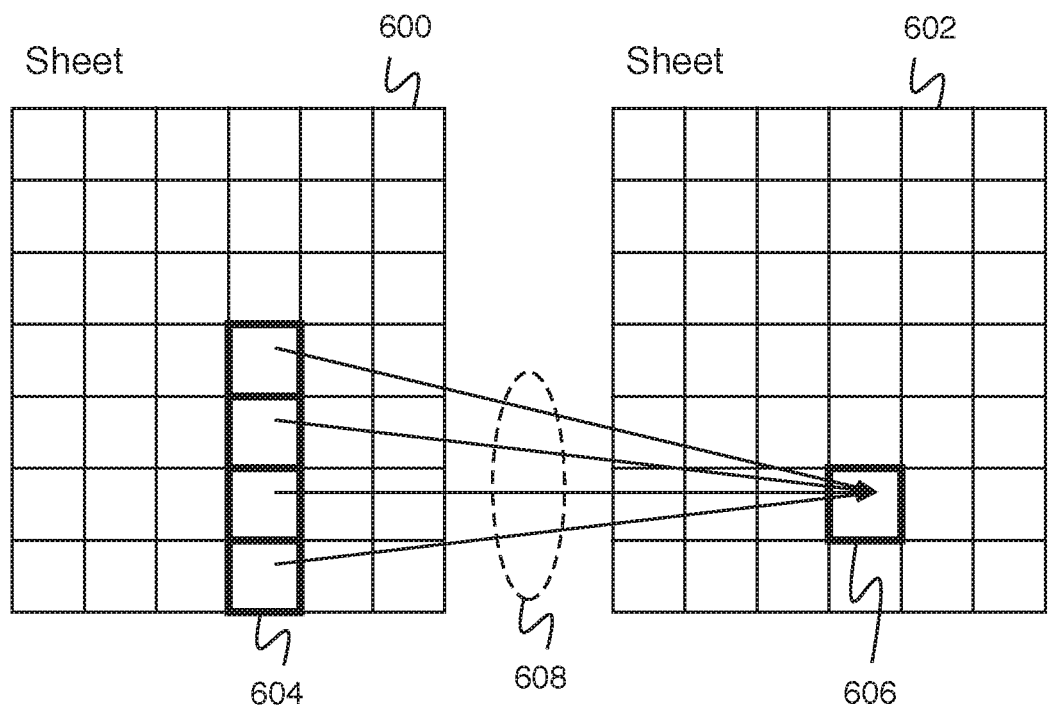
FIG. 6 is a diagram illustrating an embodiment of a funnel link dependency.

FIG. 6 is a diagram illustrating an embodiment of a funnel link dependency. In some embodiments, sheet 600 and/or sheet 602 comprise planning system data 300 of FIG. 3. In the example shown, a portion of column of cells 604 has a many to one dependency on cell 606, illustrated by dependency 608. Linking between two sheets by a many to one dependency in a row or column comprises a funnel link dependency.

Figure 7:
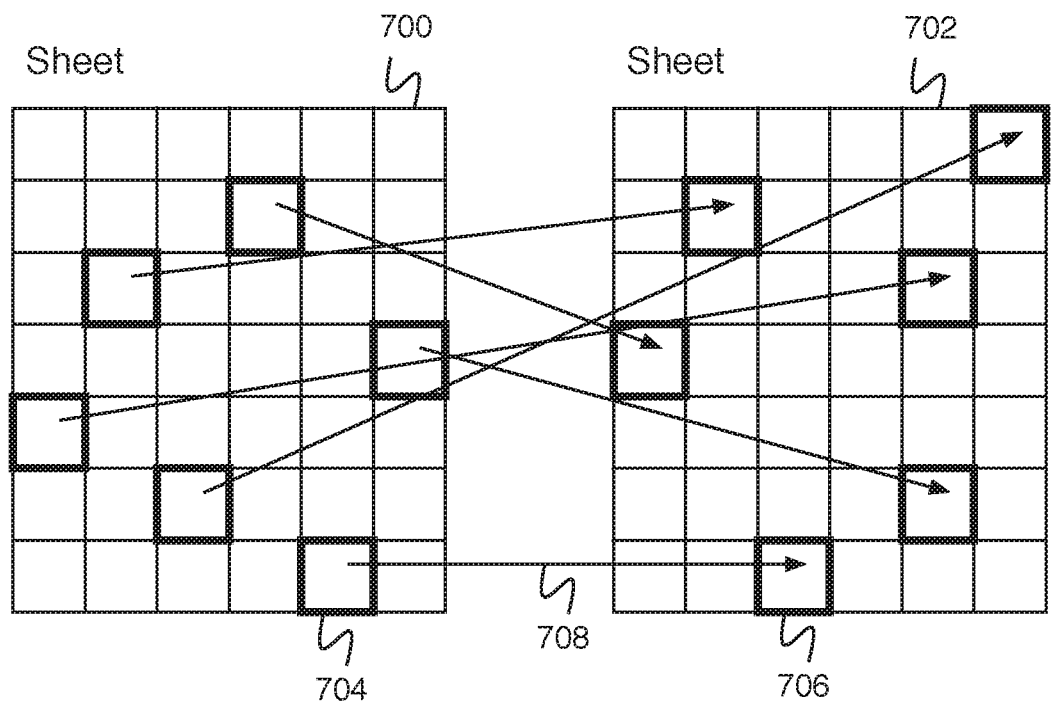
FIG. 7 is a diagram illustrating an embodiment of a mesh link dependency.

FIG. 7 is a diagram illustrating an embodiment of a mesh link dependency. In some embodiments, sheet 700 and/or sheet 702 comprise planning system data 300 of FIG. 3. In the example shown, sheet 700 comprises a plurality of cells with dependencies to cells in sheet 702 (e.g., cell 704 has dependency 708 on cell 706 and other arrow labeled dependencies between sheet 700 and sheet 702), and the plurality of cells does not comprise a row, column, or other regular structure. Linking between two sheets by a plurality of irregularly organized dependencies comprises a mesh link dependency.

Figure 8:
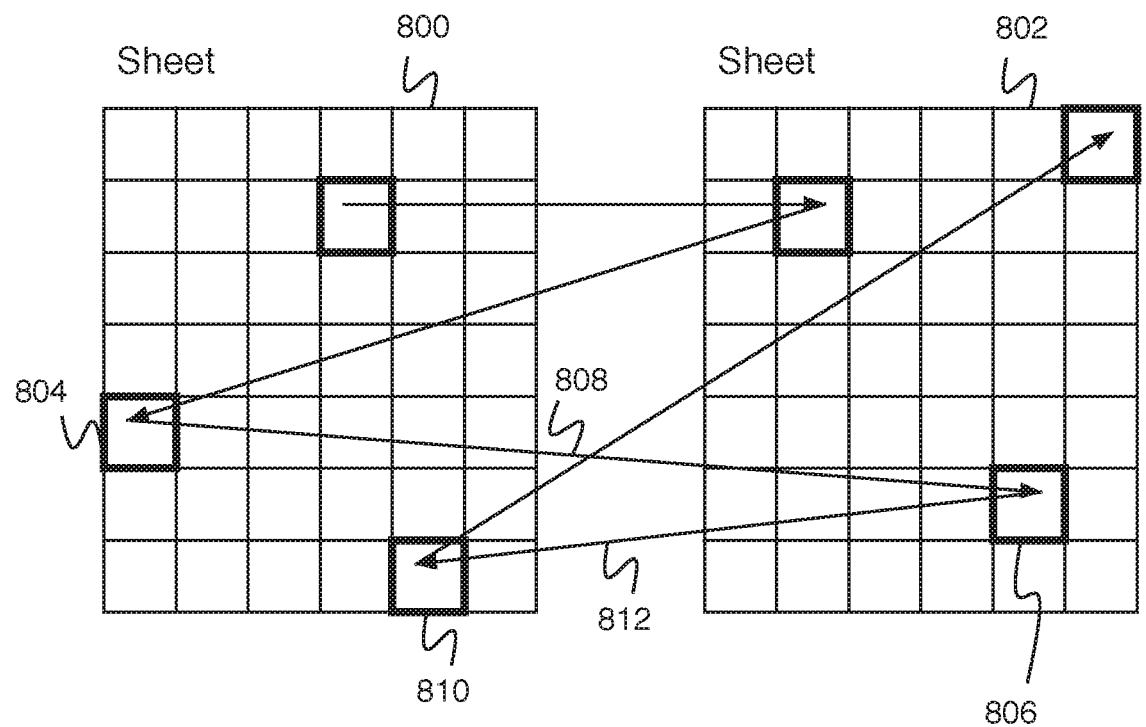
FIG. 8 is a diagram illustrating an embodiment of a knit link dependency.

FIG. 8 is a diagram illustrating an embodiment of a knit link dependency. In some embodiments, sheet 800 and/or sheet 802 comprise planning system data 300 of FIG. 3. In the example shown, sheet 800 comprises a plurality of cells with dependencies to cells in sheet 802, and sheet 802 comprises a plurality of cells with dependencies to cells in sheet 800 (e.g., cell 804 has dependency 808 on cell 806 and cell 806 has dependency 812 on cell 810). Linking between two sheets by a plurality of dependencies in both directions comprises a knit link dependency. In some embodiments, the dependencies between the two sheets are chained.

FIG. 9 is a diagram illustrating an embodiment of intrasheet parallelism. In some embodiments, sheet 900 comprises planning system data 300 of FIG. 3. In the example shown, sheet 900 comprises a set of business data. Each row of sheet 900 comprises a primary dimension of data, including units, price, bookings, rent, fees, and expenses. The row titles indicate that bookings are equal to units*price, and expenses are equal to rent+fees. Each column represents a time period. Q1, Q2, Q3, and Q4 comprise raw quarterly data, H1 comprises data for the first half and is equal to Q1+Q2, H2 comprises data for the second half and is equal to Q3+Q4, and FY comprises data for the complete fiscal year, and is equal to H1+H2. Sheet 900 can be broken into two independently computable regions, a first region comprising the rows units, price, and bookings, and a second region comprising the rows rent, fees, and expenses. These two regions are independent and can be computed in parallel on separate compute resources. In the event it is determined it is desirable to divide the sheet into four regions, sheet 900 can be broken a second time. Sheet 900 is separated into a first region comprising columns Q1, Q2, and H1, and a second region comprising columns Q3, Q4, H2, and FY. The first region can be computed independently, and the second region can be computed independently except column FY. Once all other computations are complete (e.g., columns Q1, Q2, and H1 computed independently from columns Q3, Q4, and H2), the results can be rolled together to determine a result for column FY). The results for sheet 900 can be computed using four independent computing resources, including a parallel computation step and a rollup step.

Figure 10:
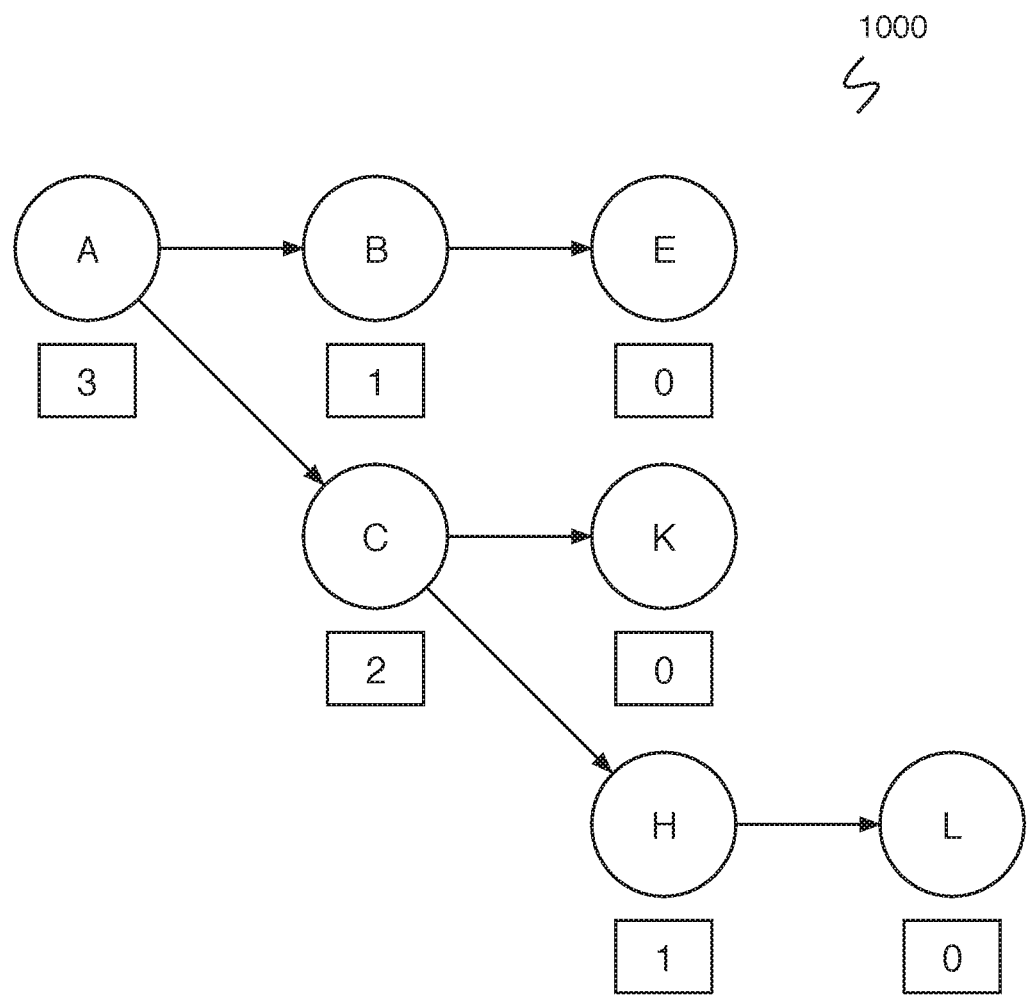
FIG. 10 is a diagram illustrating an embodiment of a directed acyclic graph.

FIG. 10 is a diagram illustrating an embodiment of a directed acyclic graph. Directed acyclic graph (e.g., DAG) 1000 comprises a set of nodes. In the example shown, each node of the directed acyclic graph is associated with a cell of a planning system. Each node is labeled with the maximum number of hops to a leaf node. A leaf node comprises a node that depends on no other nodes—for example, a leaf node is associated with a cell containing a number. A node that is not a leaf node depends on other nodes—for example, a node that is not a leaf node is associated with a cell containing a formula. Each node of DAG 1000 is labeled with the maximum number of hops to a leaf node. Nodes L, K, and E are leaf nodes and so have maximum 0 hops to a leaf node, nodes B and H have maximum 1 hop to a leaf node, node C has maximum 2 hops to a leaf node, and node A has maximum 3 hops to a leaf node. The more maximum hops to a leaf node, the less desirable it is to partition the graph on the node for computation on independent computing resources.

Figure 11:
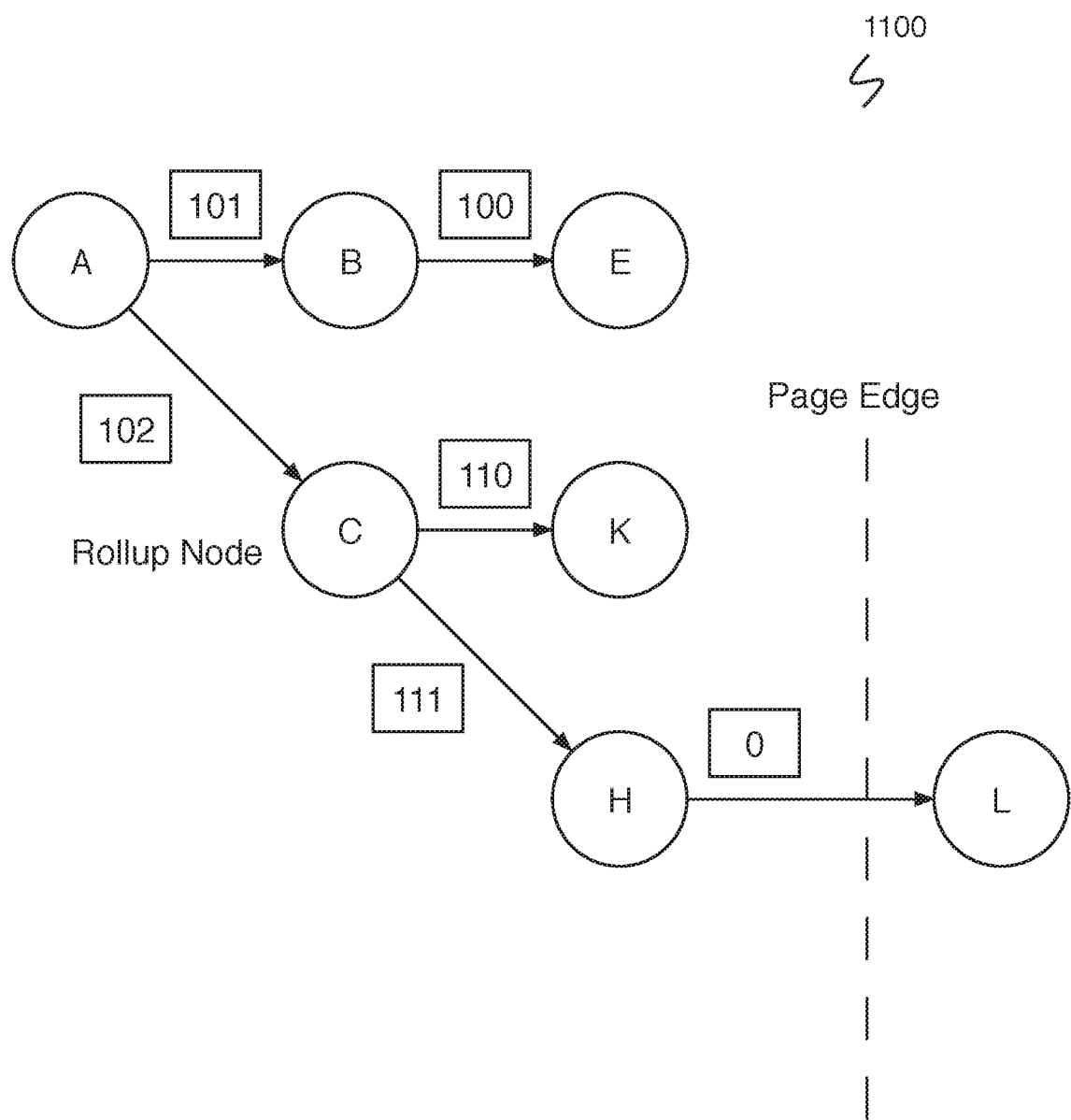
FIG. 11 is a diagram illustrating an embodiment of a directed acyclic graph with edge weights.

FIG. 11 is a diagram illustrating an embodiment of a directed acyclic graph with edge weights. In some embodiments, DAG 1100 comprises DAG 1000 of FIG. 10. In the example shown, edge weights shown are determined according to the formula: Weight=(same page)*100+(rollup level)*10+(distance to leaf node)*1. Edge H to L comprises a weight of 0, as H and L are on separate pages, no rollup is at H, and L is a leaf node. Edge C to H comprises a weight of 111, as C and H are on the same page, C is a rollup node, and H is maximum 1 hop from a leaf node. Edge C to K comprises a weight of 110, as C and K are on the same page, C is a rollup node, and K is a leaf node. Edge A to C comprises a weight of 102, as A and C are on the same page, no rollup is at A, and C is maximum 2 hops from a leaf node. Edge B to E comprises a weight of 100, as B and E are on the same page, no rollup is at B, and E is a leaf node. Edge A to B comprises a weight of 101, as A and B are on the same page, no rollup is at A, and B is maximum 1 hop from a leaf node.

Figure 12:
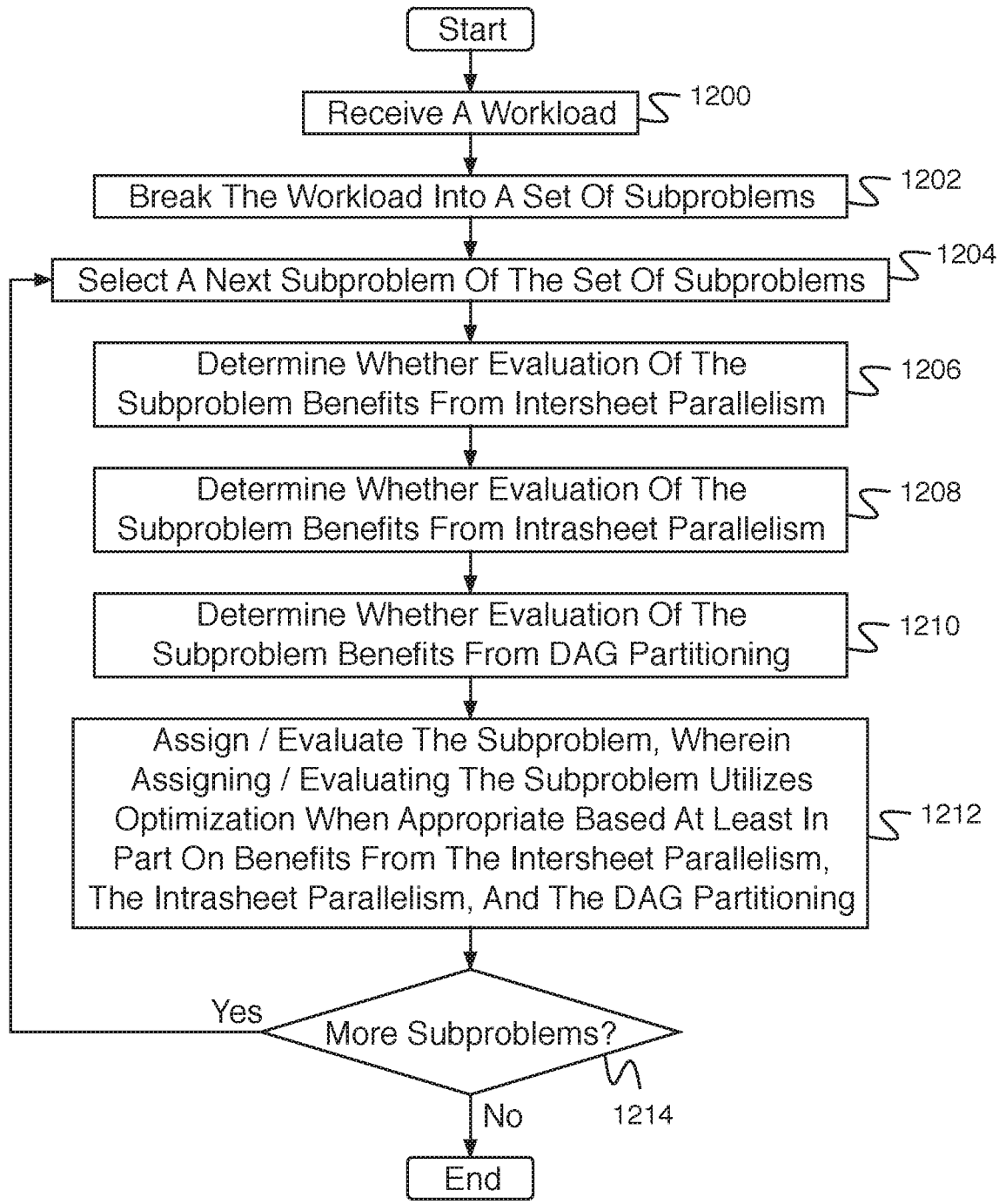
FIG. 12 is a flow diagram illustrating an embodiment of a process for assigning a workload to compute resources.

FIG. 12 is a flow diagram illustrating an embodiment of a process for assigning a workload to compute resources. In some embodiments, the process of FIG. 1 is executed by planning system 106 of FIG. 1. In the example shown, in 1200, a workload is received. For example, a workload comprises a planning sheet, a set of planning sheets, a planning hypercube comprising planning sheets, etc. In 1202, the workload is broken into a set of subproblems. In some embodiments, a subproblem of the set of subproblems comprises a sheet or a set of sheets. For example, breaking the workload into a set of subproblems comprises breaking the workload into a set of sets of sheets, wherein each set of sheets comprises one or more sheets including dependencies between the sheets, and no dependencies exist from a first set of sheets to a second set of sheets of the set of sets of sheets. In 1204, a next subproblem of the set of subproblems is selected. In some embodiments, the next subproblem comprises the first subproblem. In 1206, it is determined whether evaluation of the subproblem benefits from intersheet parallelism. For example, it is determined the subproblem benefits from evaluation and/or computation using intersheet parallelism. In 1208, it is determined whether evaluation of the subproblem benefits from intrasheet parallelism. For example, it is determined the subproblem benefits from evaluation and/or computation using intrasheet parallelism. In 1210, it is determined whether evaluation of the subproblem benefits from DAG partitioning. For example, it is determined the subproblem benefits from evaluation and/or computation using DAG partitioning. In some embodiments, it is determined whether evaluation of the subproblem benefits from DAG partitioning in the event that it is determined that evaluation of the subproblem does not benefit from intersheet parallelism or intrasheet parallelism (e.g., DAG partitioning is used in the event other approaches do not work). In 1212, the subproblem is assigned/evaluated, wherein assigning/evaluating the subproblem utilizes optimization when appropriate based at least in part on benefits from the intersheet parallelism, the intrasheet parallelism, and the DAG partitioning. In 1214, it is determined whether there are more subproblems. In response to there being more subproblems, control passes to 1204. In response to there being no more subproblems, the process ends.

Figure 13:
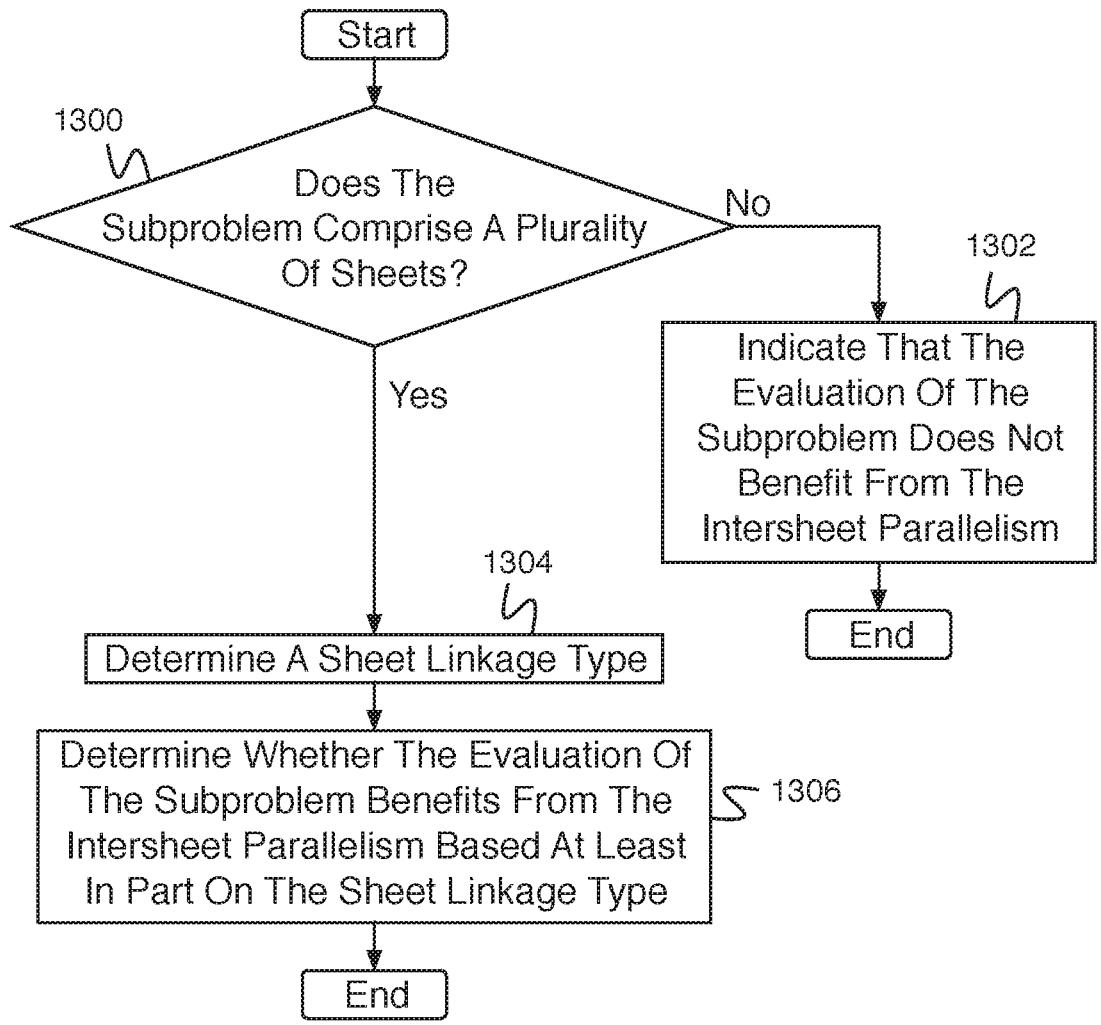
FIG. 13 is a flow diagram illustrating an embodiment of a process for determining whether evaluation of a subproblem benefits from intersheet parallelism.

FIG. 13 is a flow diagram illustrating an embodiment of a process for determining whether evaluation of a subproblem benefits from intersheet parallelism. In some embodiments, the process of FIG. 13 implements 1206 of FIG. 12. In the example shown, in 1300, it is determined whether the subproblem comprises a plurality of sheets (e.g., or one sheet). In response to determining that the subproblem does not comprise a plurality of sheets (e.g., that the subproblem only comprises one sheet), control passes to 1302. In 1302, the process indicates that evaluation of the subproblem does not benefit from the intersheet parallelism, and the process ends. In response to determining in 1300 that the subproblem comprises a plurality of sheets, control passes to 1304. In 1304, a sheet linkage type is determined. For example, a sheet linkage type comprises a rope linkage type, a ladder linkage type, a funnel linkage type, a mesh linkage type, or a knit linkage type. In some embodiments, sheets with no linkage are already separated (e.g., sheets with no linkage are separated when the workload was broken into a set of subproblems). In 1306, it is determined whether the evaluation of the subproblem benefits from the intersheet parallelism based at least in part on the sheet linkage type, and the process ends. For example, it is determined whether the subproblem benefits from computation and/or evaluation using the intersheet parallelism based at least in part on the sheet linkage type.

Figure 14:
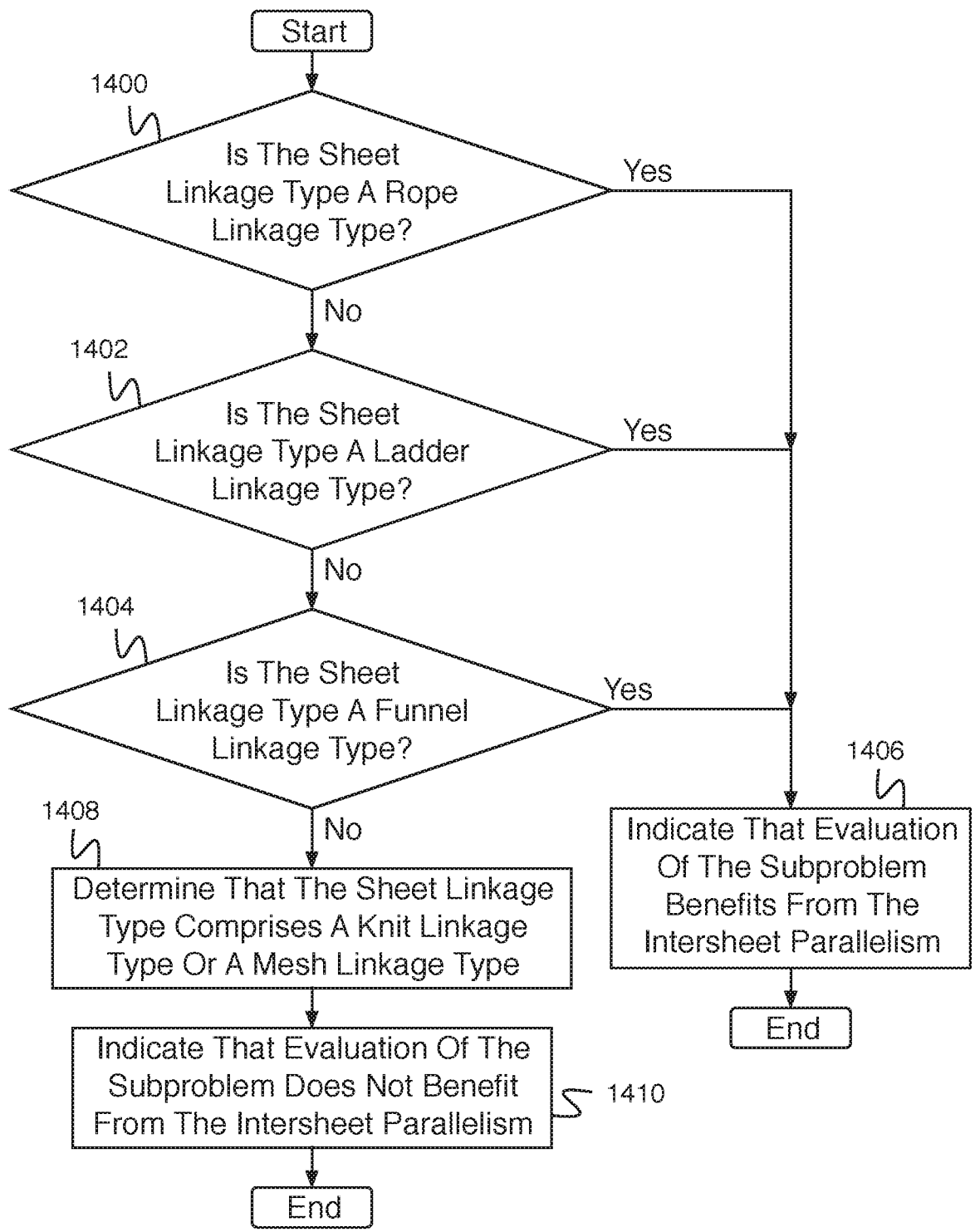
FIG. 14 is a flow diagram illustrating an embodiment of a process for determining whether evaluation of a subproblem benefits from intersheet parallelism based at least in part on a sheet linkage type.

FIG. 14 is a flow diagram illustrating an embodiment of a process for determining whether evaluation of a subproblem benefits from intersheet parallelism based at least in part on a sheet linkage type. In some embodiments, the process of FIG. 14 implements 1306 of FIG. 13. In the example shown, in 1400, it is determined whether the sheet linkage type is a rope linkage type. In response to determining that the sheet linkage type is a rope linkage type, control passes to 1406. In response to determining that the sheet linkage type is not a rope linkage type, control passes to 1402. In 1402, it is determined whether the sheet linkage type is a ladder linkage type. In response to determining that the sheet linkage type is a ladder linkage type, control passes to 1406. In response to determining that the sheet linkage type is not a ladder linkage type, control passes to 1404. In 1404, it is determined whether the sheet linkage type is a funnel linkage type. In response to determining that the sheet linkage type is a funnel linkage type, control passes to 1406. In 1406, the process indicates that evaluation of the subproblem benefits from the intersheet parallelism, and the process ends. For example, the subproblem benefits from evaluation and/or computation using intersheet parallelism. In response to determining in 1404 that the sheet linkage type does not comprise a funnel linkage type, control passes to 1408. In 1408, it is determined that the sheet linkage type comprises a knit linkage type or a mesh linkage type (e.g., that the linkage type comprises a complex linkage type). In 1410, the process indicates that evaluation of the subproblem does not benefit from the intersheet parallelism, and the process ends. For example, the subproblem does not benefit from evaluation and/or computation using intersheet parallelism.

Figure 15:
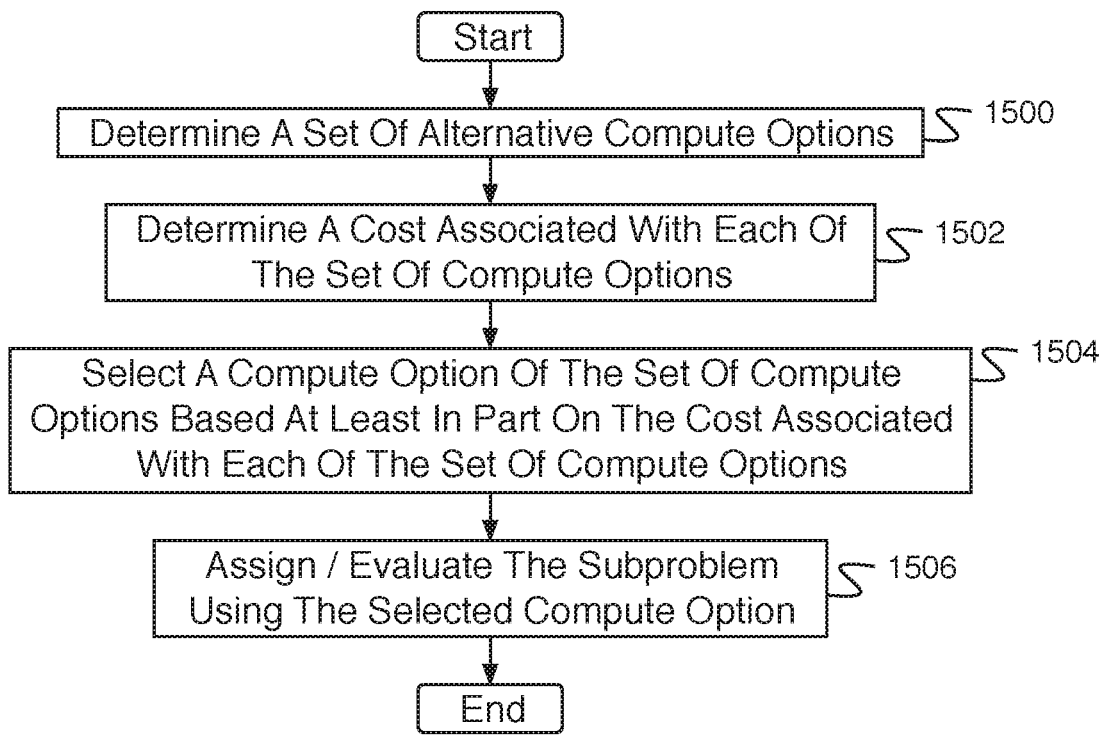
FIG. 15 is a flow diagram illustrating an embodiment of a process for evaluating a subproblem, wherein the subproblem utilizes optimization based at least in part on benefits from intersheet parallelism.

FIG. 15 is a flow diagram illustrating an embodiment of a process for evaluating a subproblem, wherein the subproblem utilizes optimization based at least in part on benefits from intersheet parallelism. In some embodiments, the process of FIG. 15 implements 1212 of FIG. 12. In the example shown, in 1500, a set of alternate compute options are determined. For example, alternate compute options comprise compute options wherein sheets are computed in parallel and compute options wherein sheets are computed sequentially. In 1502, a cost associated with each of the alternate compute options is determined. For example, a cost is determined using a cost function. In some embodiments, the cost function returns a higher number if there is more computation work involved. In various embodiments, the computation in a problem (or sub-problem) includes one or more components of the following: a) a number of single formula computation calls—also called scaler computations (SC); b) a number of vector calculation calls for bulk computation (VC) (e.g., when the computation cost=units*price for each time period in parallel); or c) a number of data transfers over the network between servers if the computation is distributed across servers (NC), or any other appropriate computations. In some embodiments, the cost function $C_f = G_m(SC, VC, NC)$, where $G_m$ is a geometric mean. In some embodiments, the three variables are not correlated, and the cost function should be fair when it comes to a percentage change in any component irrespective of which is bigger or smaller. In contrast, an arithmetic mean is used instead of a geometric mean in which case the cost function is biased towards the change in bigger numbers. In some embodiments, a harmonic mean is used instead of a geometric mean in which case the cost function is biased towards changes in smaller numbers. In 1504, a compute option of the set of compute options is selected based at least in part on the cost associated with each of the set of compute options. In 1506, the subproblem is assigned/evaluated using the selected compute option.

Figure 16:
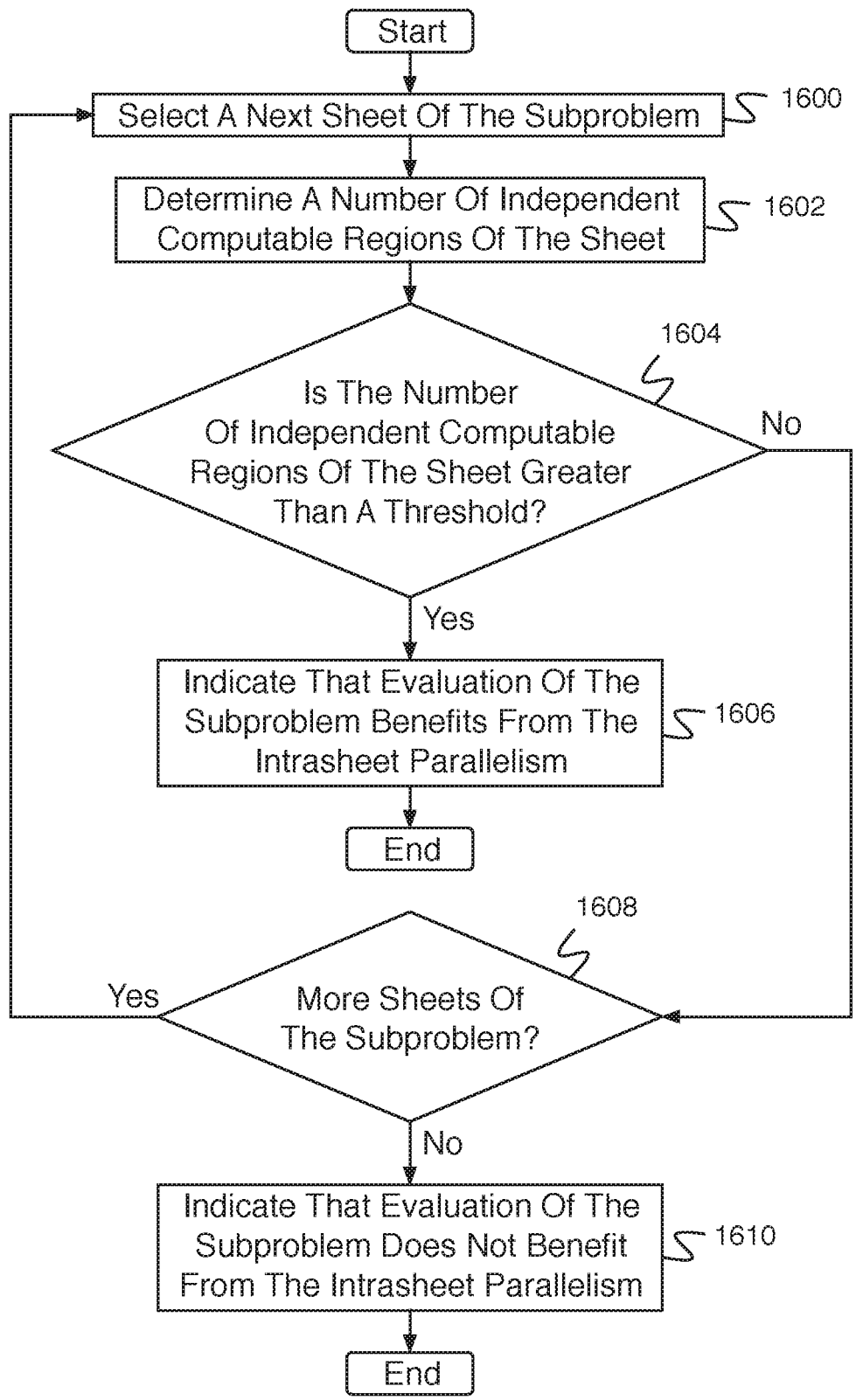
FIG. 16 is a flow diagram illustrating an embodiment of a process for determining whether evaluation of a subproblem benefits from intrasheet parallelism.

FIG. 16 is a flow diagram illustrating an embodiment of a process for determining whether evaluation of a subproblem benefits from intrasheet parallelism. In some embodiments, the process of FIG. 16 implements 1208 of FIG. 12. In the example shown, in 1600, a next sheet of the subproblem is selected. In some embodiments, the next sheet comprises the first sheet. In 1602, a number of independent computable regions of the sheet is determined. In 1604, it is determined whether the number of independent computable regions of the sheet is greater than a threshold. For example, the threshold comprises the number of available compute resources. In response to determining that the number of independent computable regions of the sheet is greater than a threshold, control passes to 1606. In 1606, the process indicates that evaluation of the subproblem benefits from the intrasheet parallelism, and the process ends. For example, the subproblem benefits from evaluation and/or computation using intrasheet parallelism. In response to determining in 1604 that the number of independent computable regions of the sheet is not greater than a threshold, control passes to 1608. In 1608, it is determined whether there are more sheets of the subproblem. In response to determining that there are more sheets of the subproblem, control passes to 1600. In response to determining that there are not more sheets of the subproblem, control passes to 1610. In 1610, the process indicates that evaluation of the subproblem does not benefit from intrasheet parallelism, and the process ends. For example, the subproblem does not benefit from evaluation and/or computation using intrasheet parallelism.

Figure 17:
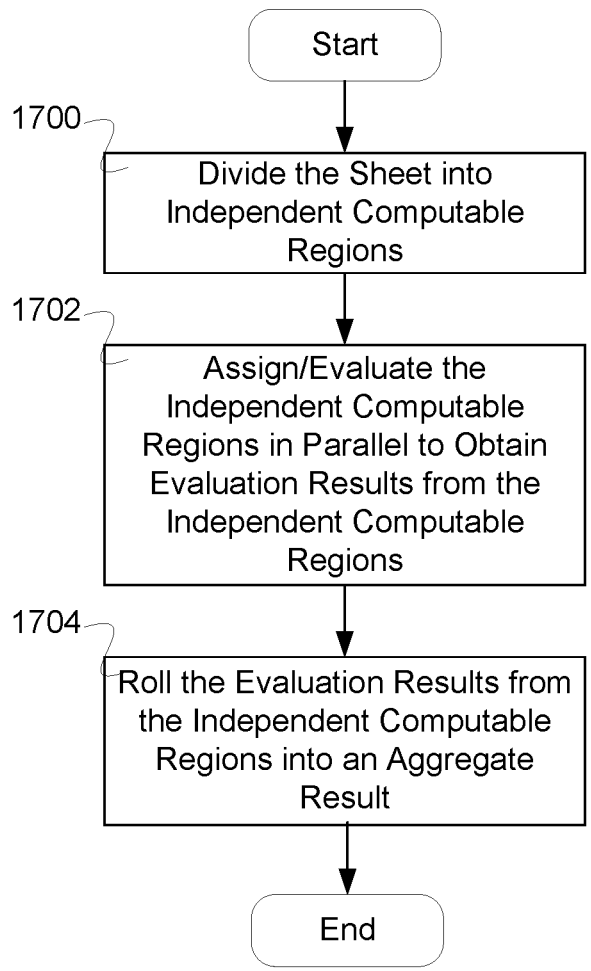
FIG. 17 is a flow diagram illustrating an embodiment of a process for evaluating a subproblem, wherein the subproblem utilizes optimization based at least in part on benefits from intrasheet parallelism.
Figure 18:
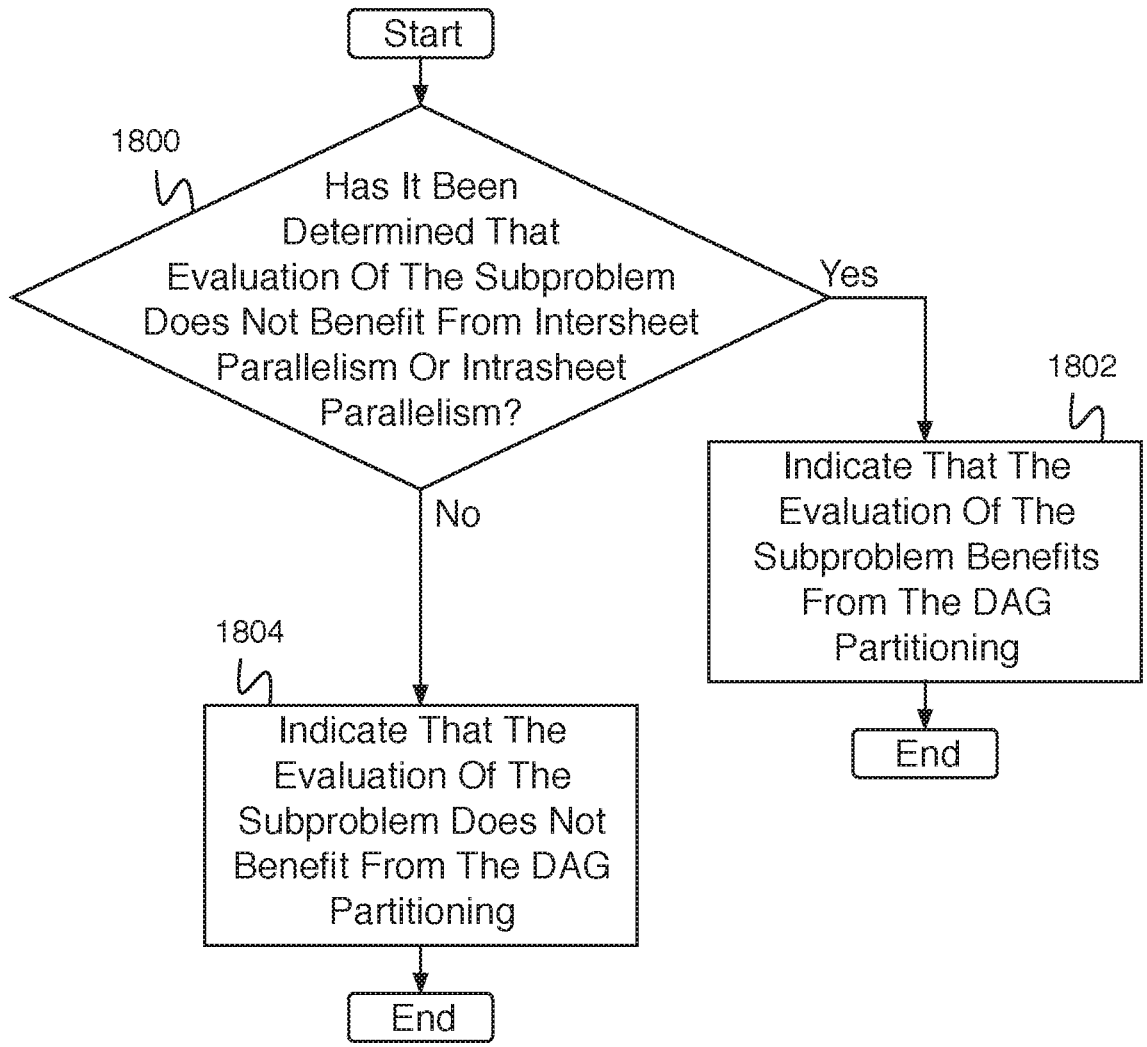
FIG. 18 is a flow diagram illustrating an embodiment of a process for determining whether evaluation of the subproblem benefits from DAG partitioning.
Figure 19:
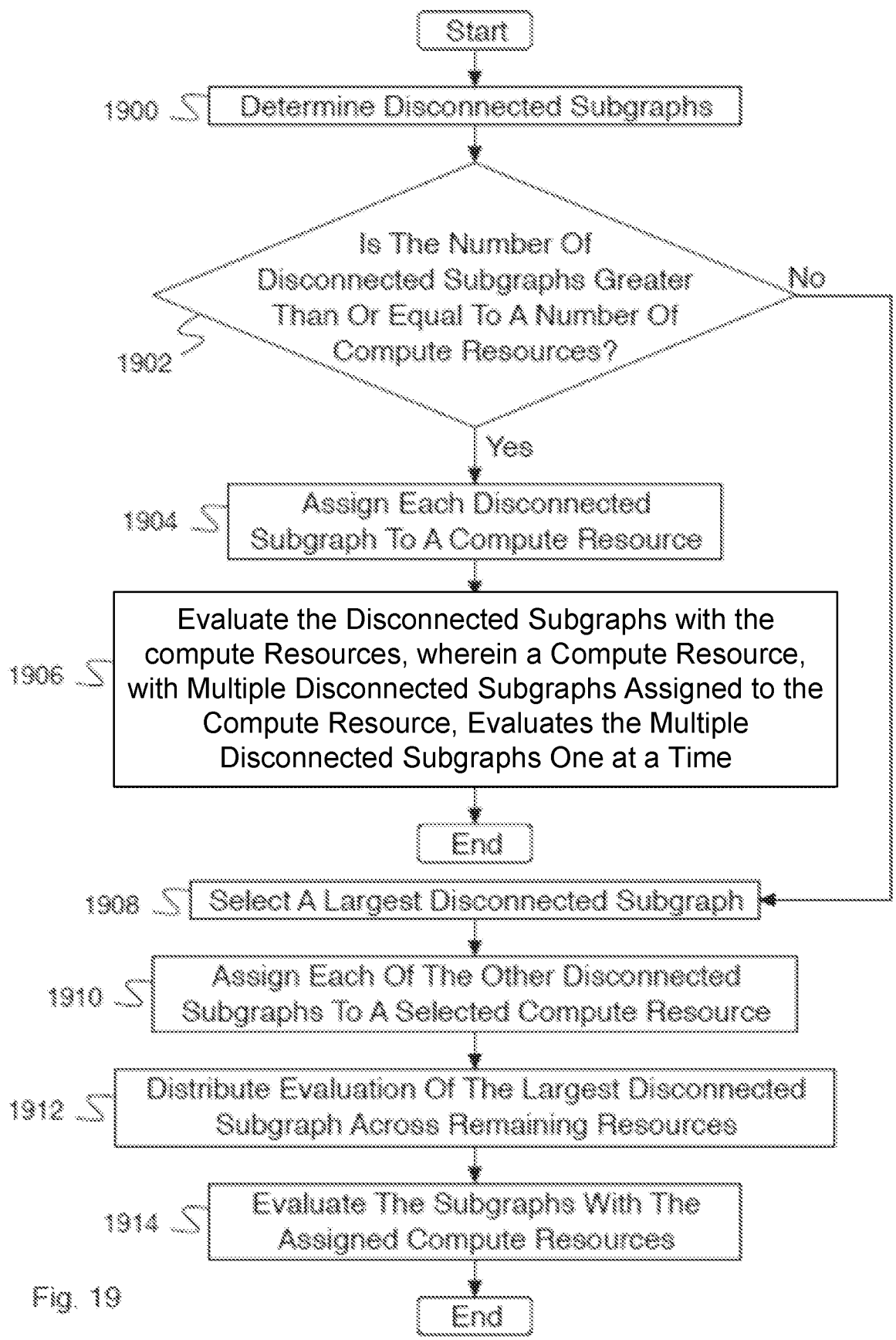
FIG. 19 is a flow diagram illustrating an embodiment of a process for evaluating a subproblem, wherein the subproblem utilizes optimization based at least in part on benefits from DAG partitioning.

FIG. 17 is a flow diagram illustrating an embodiment of a process for evaluating a subproblem, wherein the subproblem utilizes optimization based at least in part on benefits from intrasheet parallelism. In some embodiments, the process of FIG. 17 implements 1212 of FIG. 12. In the example shown, in 1700, the sheet is divided into independent computable regions. In 1702, the independent computable regions are assigned/evaluated in parallel (e.g., using separate compute resources). In some embodiments, an independent computable region is marked as partially computed when it is evaluated. In 1704, the evaluation results from the independent computable regions are rolled into an aggregate results. For example, rolling evaluation results from independent computable regions into aggregate results comprises evaluating one or more cells that depend on cells in multiple independent computable regions. In some embodiments, independent computable regions are marked as fully computed when rolling the evaluation results from the independent computable regions into the aggregated result is completed FIG. 18 is a flow diagram illustrating an embodiment of a process for determining whether evaluation of the subproblem benefits from DAG partitioning. In some embodiments, the process of FIG. 18 implements 1210 of FIG. 12. In the example shown, in 1800, it is determined whether it has been determined that evaluation of the subproblem does not benefit from intersheet parallelism or intrasheet parallelism. In response to determining that evaluation of the subproblem does not benefit from intersheet parallelism or intrasheet parallelism, control passes to 1804. In 1804, the process indicates that evaluation of the subproblem does not benefit from the DAG partitioning, and the process ends. For example, the subproblem does not benefit from evaluation and/or computation using the DAG partitioning. In response to determining in 1800 that evaluation of the subproblem does not benefit from intersheet parallelism or intrasheet parallelism, control passes to 1802. In 1802, the process indicates that the evaluation of the subproblem benefits from the DAG partitioning, and the process ends. For example, the process indicates that the subproblem benefits from evaluation and/or computation from the DAG partitioning FIG. 19 is a flow diagram illustrating an embodiment of a process for evaluating a subproblem, wherein the subproblem utilizes optimization based at least in part on benefits from DAG partitioning. In some embodiments, the process of FIG. 19 is used to implement 1212 of FIG. 12. In the example shown, in 1900, disconnected subgraphs are determined. For example, disconnected subgraphs comprise subgraphs with no dependencies between them. In 1902, it is determined whether the number of disconnected subgraphs is greater than or equal to a number of compute resources. In response to determining that the number of disconnected subgraphs is greater than or equal to a number of compute resources, control passes to 1904. In 1904, each disconnected subgraph is assigned to a compute resource. In 1906, the disconnected subgraphs are evaluated with the compute resources, wherein a compute resource, with multiple disconnected subgraphs assigned to the compute resource, evaluates the multiple disconnected subgraphs one at a time. After 1906, the process then ends. In response to determining in 1902 that the number of disconnected subgraphs is not greater than or equal to a number of compute resources, control passes to 1908. In 1908, a largest disconnected subgraph is selected. For example the largest disconnected subgraph comprises a disconnected subgraph comprising a largest number of nodes, an edges subgraph comprising a largest number of edges, or a random subgraph chosen randomly. In 1910, each of the other disconnected subgraphs is assigned to a selected compute resource. For example, for each of the other disconnected subgraphs, a previously unassigned compute resource is selected, and the disconnected subgraph is assigned to the selected compute resource. In 1912, evaluation of the largest disconnected subgraph is distributed across the remaining resources. For example, distributing evaluation of the largest disconnected subgraph across the remaining resources comprises dividing the largest subgraph into a set of subgraphs based at least in part on a set of edge weights, dividing the largest subgraph into a set of subgraphs using a minimum cut algorithm, or dividing the largest subgraph into a set of subgraphs using the Stoer-Wagner algorithm. Each subgraph of the resulting set of subgraphs is then assigned to a compute resource. In 1914, the subgraphs are evaluated with the assigned compute resources, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for assigning a workload to compute resources, comprising:
   an interface configured to:
      receive a workload; and
   a processor configured to:
      break the workload into a set of subproblems; and
      for a subproblem of the set of subproblems, wherein the subproblem comprises a set of sheets of a hypercube:
         determine whether evaluation of the subproblem benefits in computational speed from intersheet parallelism or intrasheet parallelism;
         in response to a determination that evaluation of the subproblem does not benefit in computational speed from intersheet parallelism or instrasheet parallelism:
            determine whether evaluation of the subproblem benefits in computational speed from directed acyclic graph (DAG) partitioning; and
            in response to a determination that evaluation of the subproblem benefits in computational speed from DAG partitioning, assign and evaluate the subproblem using DAG partitioning, wherein evaluating the subproblem using DAG partitioning comprises computing a first disconnected subgraph of the subproblem and a second disconnected subgraph of the subproblem in parallel on separate compute resources.

2. The system of claim 1, wherein determining whether the subproblem benefits from the intersheet parallelism comprises:
   determining whether the subproblem comprises a plurality of sheets; and
   in response to determining that the subproblem comprises the plurality of sheets:
   determining a sheet linkage type; and
   determining whether the subproblem benefits from the intersheet parallelism based at least in part on the sheet linkage type.

3. The system of claim 2, wherein in response to the sheet linkage type being determined to be a rope linkage type, a ladder linkage type, or a funnel linkage type, it is determined that the subproblem benefits from the intersheet parallelism.

4. The system of claim 2, wherein in response to the sheet linkage type being determined to be a mesh linkage type or a knit linkage type, it is determined that the subproblem does not benefit from the intersheet parallelism.

5. The system of claim 1, wherein in response to determining that the subproblem benefits from the intersheet parallelism, a set of compute options are determined, wherein the compute options comprise sheets computed in parallel, sheets computed sequentially, or a combination thereof.

6. The system of claim 5, wherein a cost associated with each compute option of the set of compute options is determined.

7. The system of claim 6, wherein a compute option of the set of compute options is selected based at least in part on the cost associated with each of the set of compute options.

8. The system of claim 1, wherein determining whether the subproblem benefits from the intrasheet parallelism comprises determining whether a sheet of the subproblem is divisible into greater than a threshold number of independent computable regions.

9. The system of claim 8, wherein the threshold number comprises a number of available compute resources.

10. The system of claim 1, wherein in response to determining that the subproblem benefits from the intrasheet parallelism, the sheet is divided into independent computable regions, the independent computable regions are evaluated in parallel, and the evaluation results from the independent computable regions are rolled into an aggregated result.

11. The system of claim 10, wherein an independent computable region of the independent computable regions is marked as partially computed when it is evaluated.

12. The system of claim 11, wherein the independent computable regions are marked as fully computed when rolling the evaluation results from the independent computable regions into the aggregated result is completed.

13. The system of claim 1, wherein in response to determining that the subproblem benefits from DAG partitioning, the subproblem comprises determining disconnected subgraphs.

14. The system of claim 13, wherein in response to a number of disconnected subgraphs being greater than or equal to a number of compute resources, each disconnected subgraph is assigned to a compute resource and disconnected subgraphs are evaluated by compute resources, wherein a compute resource with multiple disconnected subgraphs assigned to the compute resource evaluates the multiple disconnected subgraphs one at a time.

15. The system of claim 13, wherein in response to a number of disconnected subgraphs being less than the number of compute resources, a largest disconnected subgraph is selected; other disconnected subgraphs are each assigned to a selected compute resource, and evaluation of the largest disconnected subgraph is distributed across remaining resources.

16. The system of claim 15, wherein the largest disconnected subgraph comprises a disconnected subgraph comprising a largest number of nodes or a largest number of edges.

17. The system of claim 15, wherein distributing the largest subgraph across remaining resources comprises dividing the largest subgraph into a set of subgraphs based at least in part on a set of edge weights, wherein each edge weight of the set of edge weights is based at least in part on a same page weight, a rollup level, and a distance to leaf node.

18. The system of claim 15, wherein distributing the largest subgraph across remaining resources comprises dividing the largest subgraph into a set of subgraphs using a minimum cut algorithm or the Stoer-Wagner algorithm.

19. The system of claim 1, wherein in response to a determination that evaluation of the subproblem benefits in computational speed from intersheet parallelism, assign and evaluate the subproblem using intersheet parallelism, wherein evaluating the subproblem using intersheet parallelism comprises computing a first sheet of the subproblem and a second sheet of the subproblem in parallel on the separate compute resources.

20. The system of claim 1, wherein in response to a determination that evaluation of the subproblem benefits in computational speed from intrasheet parallelism, assign and evaluate the subproblem using intrasheet parallelism, wherein evaluating the subproblem using intrasheet parallelism comprises computing a first independent section of a sheet of the subproblem and a second independent section of the sheet of the subproblem in parallel on the separate compute resources.

21. A method for assigning a workload to compute resources, comprising:
  receiving a workload;
  breaking the workload into a set of subproblems using a processor; and
  for a subproblem of the set of subproblems, wherein the subproblem comprises a set of sheets of a hypercube:
    determining whether evaluation of the subproblem benefits in computational speed from intersheet parallelism or intrasheet parallelism;
    in response to a determination that evaluation of the subproblem does not benefit computational speed from intersheet parallelism or instrasheet parallelism:
      determining whether the subproblem benefits in computational speed from directed acyclic graph (DAG) partitioning; and
      in response to a determination that evaluation of the subproblem benefits in computational speed from DAG partitioning, assign and evaluate the subproblem using DAG partitioning, wherein evaluating the subproblem using DAG partitioning comprises computing a first disconnected subgraph of the subproblem and a second disconnected subgraph of the subproblem in parallel on separate compute resources.

22. A computer program product for assigning a workload to compute resources, the computer program product being embodied in a non-transitory computer readable storage medium and comprising computer instructions for:
  receiving a workload;
  breaking the workload into a set of subproblems; and
  for a subproblem of the set of subproblems, wherein the subproblem comprises a set of sheets of a hypercube:
    determining whether evaluation of the subproblem benefits in computational speed from intersheet parallelism or intrasheet parallelism;
    in response to a determination that evaluation of the subproblem does not benefit computational speed from intersheet parallelism or instrasheet parallelism:
      determining whether the subproblem benefits in computational speed from directed acyclic graph (DAG) partitioning; and
      in response to a determination that evaluation of the subproblem benefits in computational speed from DAG partitioning, assign and evaluate the subproblem using DAG partitioning, wherein evaluating the subproblem using DAG partitioning comprises computing a first disconnected subgraph of the subproblem and a second disconnected subgraph of the subproblem in parallel on separate compute resources.

* * * * *